United States Patent [19]
Ishiguro et al.

[11] 4,200,375
[45] Apr. 29, 1980

[54] EXPOSURE CONTROLLING CIRCUIT FOR ELECTRIC SHUTTER

[75] Inventors: Yasuo Ishiguro; Kenji Wakazono; Toshihisa Saito, all of Tokyo, Japan

[73] Assignee: Copal Company Limited, Tokyo, Japan

[21] Appl. No.: 951,453

[22] Filed: Oct. 13, 1978

[30] Foreign Application Priority Data
Oct. 19, 1977 [JP] Japan .......................... 52/140288[U]

[51] Int. Cl.$^2$ .............................................. G03B 7/08
[52] U.S. Cl. .................................. 354/50; 354/23 D; 354/60 R; 354/60 L
[58] Field of Search ................... 354/23 D, 38, 50, 51, 354/60 R

[56] References Cited
U.S. PATENT DOCUMENTS

| | | | |
|---|---|---|---|
| 3,500,729 | 3/1970 | Rentschler et al. ................... | 354/51 |
| 3,641,902 | 2/1972 | Kikuchi et al. ........................ | 354/51 |
| 3,798,664 | 3/1974 | Matsuda ................................ | 354/51 |
| 3,914,776 | 10/1975 | Tsujimoto et al. ................... | 354/51 |

*Primary Examiner*—Russell E. Adams
*Attorney, Agent, or Firm*—Cushman, Darby & Cushman

[57] ABSTRACT

An exposure controlling circuit for electric shutters comprising a timer circuit which can determine a proper exposure time in response to the brightness of an object to be photographed and another time circuit which can determine the specific shortest exposure time in order to regulate the exposure time to be determined by the brightness of the object to be photographed to be less than the shortest exposure time obtainable by the inherent performance of the shutter mechanism to be used, whereby when the states of the above mentioned two time circuit started to act simultaneously in relation to the shutter release operation are reversed to each other, the shutter is closed. The above mentioned specific shortest exposure time can be selected.

2 Claims, 2 Drawing Figures

EXPOSURE CONTROLLING CIRCUIT FOR ELECTRIC SHUTTER

BACKGROUND OF THE INVENTION (a) Field of the Invention

The present invention relates to exposure controlling circuits adapted to diaphragm presetting type electric shutters and more particularly to an exposure controlling circuit wherein the shortest exposure time to be obtained can be regulated to be of a value adapted to the performance of the shutter mechanism.

(b) Description of the Prior Art

Generally, in a photographic camera equipped with a diaphragm presetting type electric shutter, in case a proper exposure time to be determined by a light measuring circuit in response to the brightness of an object to be photographed is shorter than the shortest exposure time controllable by the inherent performance of the shutter mechanism, no photograph of a proper exposure will be obtained. Particularly, in case such situation occurs, with a forcal plane shutter, no exposure will be made on the entire surface of the film frame or the exposure will extremely fluctuate. In the past, in such case, the photographing was ended as it was or the rear shutter blades were not made to run.

SUMMARY OF THE INVENTION

A primary object of the present invention is to provide an exposure controlling circuit arranged so that, by noting that an over exposed negative can be properly adjusted at the time of printing it, in case an exposure time determined by a light measuring circuit is shorter than an exposure time which can be assured by the inherent performance of the shutter mechanism, the exposure is forcibly terminated with the fixed shortest exposure time preset in conformity with the inherent performance of the shutter mechanism.

Another object of the present invention is to provide an exposure controlling circuit of this type which is arranged so that the fixed shortest exposure time to be preset can be selected and is commonly applicable to any high, medium and primary class cameras.

These and other objects of the present invention will become more apparent during the course of the following detailed description and appended claims.

DESCRIPTION OF THE PREFERRED EMBODIMENTS

Figure 1:
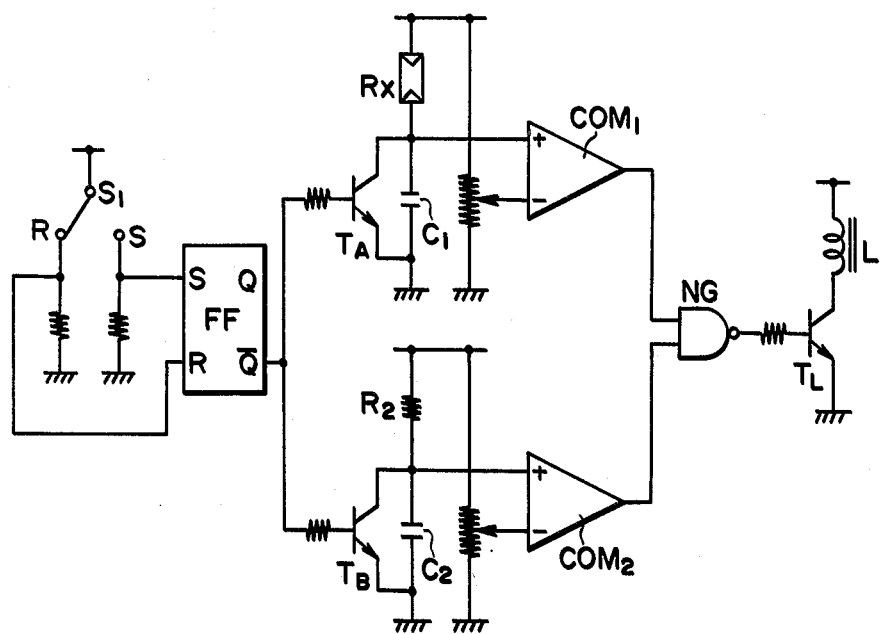
FIG. 1 is a circuit diagram showing an embodiment of an exposure controlling circuit according to the present invention.

First of all, in the embodiment shown in FIG. 1, symbol $S_1$ indicates a timing switch, FF indicates a flip-flop circuit, Rx and $C_1$ indicate respectively a photoconductive element and capacitor forming a first time circuit which can determine an exposure time in response to the brightness of an object to be photographed, $R_2$ and $C_2$ indicate respectively a resistor and capacitor forming a second time circuit for regulating the shortest exposure time, $COM_1$ and $COM_2$ indicate comparator circuits, $T_A$, $T_B$ and $T_L$ indicate transistors, NG indicates a NAND gate circuit, and L indicates a coil for controlling the closure of the shutter.

The operation of this circuit shall be explained in the following.

In photographing, when the release button of the camera is pushed, first a current source switch not shown will be switched on and a voltage will be supplied to the respective parts of the circuit. In this state, the outputs of the comparator circuits $COM_1$ and $COM_2$ will be both on the "L" level and the output of the NAND gate circuit NG will be placed on the "H" level. Therefore, the transistor $T_L$ will become conductive state to energize the coil L and hold a shutter closing driving member in a cocked state. Then, in the final stage of pushing the release button, when a shutter opening driving member not shown is released to open the shutter, the timing switch $S_1$ will be changed over to a terminal S from a terminal R as associated with it. By this changing over of the switch $S_1$, the flip-flop circuit FF will be set and the output $\overline{Q}$ will reverse to the "L" level to make non-conductive state both transistors $T_A$ and $T_B$. As a result, the above mentioned first and second time circuits will simultaneously start to act. Here, in case the delay time determined by the first time circuit is longer than the delay time determined by the second time circuit, that is, in case the proper exposure time determined by the brightness of the object to be photographed is longer than the preset shortest exposure time, before the delay time determined by the first time circuit elapses, the output of the comparator circuit $COM_2$ will have already reversed to the "H" level and therefore, when the delay time determined by the first time circuit elapses and the output of the comparator circuit $COM_1$ reverses to the "H" level, the output of the NAND gate circuit NG will reverse to the "L" level. Therefore, the transistor $T_L$ will become non-conductive state and the coil L will be de-energized to release the shutter closing driving member and close the shutter. On the other hand, in case the delay time determined by the first time circuit is shorter than the delay time determined by the second time circuit, that is, in case the proper exposure time determined by the brightness of the object to be photographed is shorter than the above mentioned shortest exposure time, the output of the comparator circuit $COM_1$ will first reverse to the "H" level but the output of the comparator circuit $COM_2$ will be still on the "L" level and therefore the shutter will not be closed. When the time corresponding to the preset shortest exposure time elapses and the output of the comparator circuit $COM_2$ also reverses to the "H" level, the same as is described above, the shutter will be closed.

As in the above, in case the proper exposure time corresponding to the brightness of the object to be photographed is shorter than the preset shortest exposure time, the photographing will be made at a proper shutter speed and, in case it is longer, the photographing will be made at the fixed highest shutter speed.

In the above mentioned embodiment, in order to make it possible to switch the shortest exposure time, for example, the part of the resistor $R_2$ may be made switchable.

Figure 2:
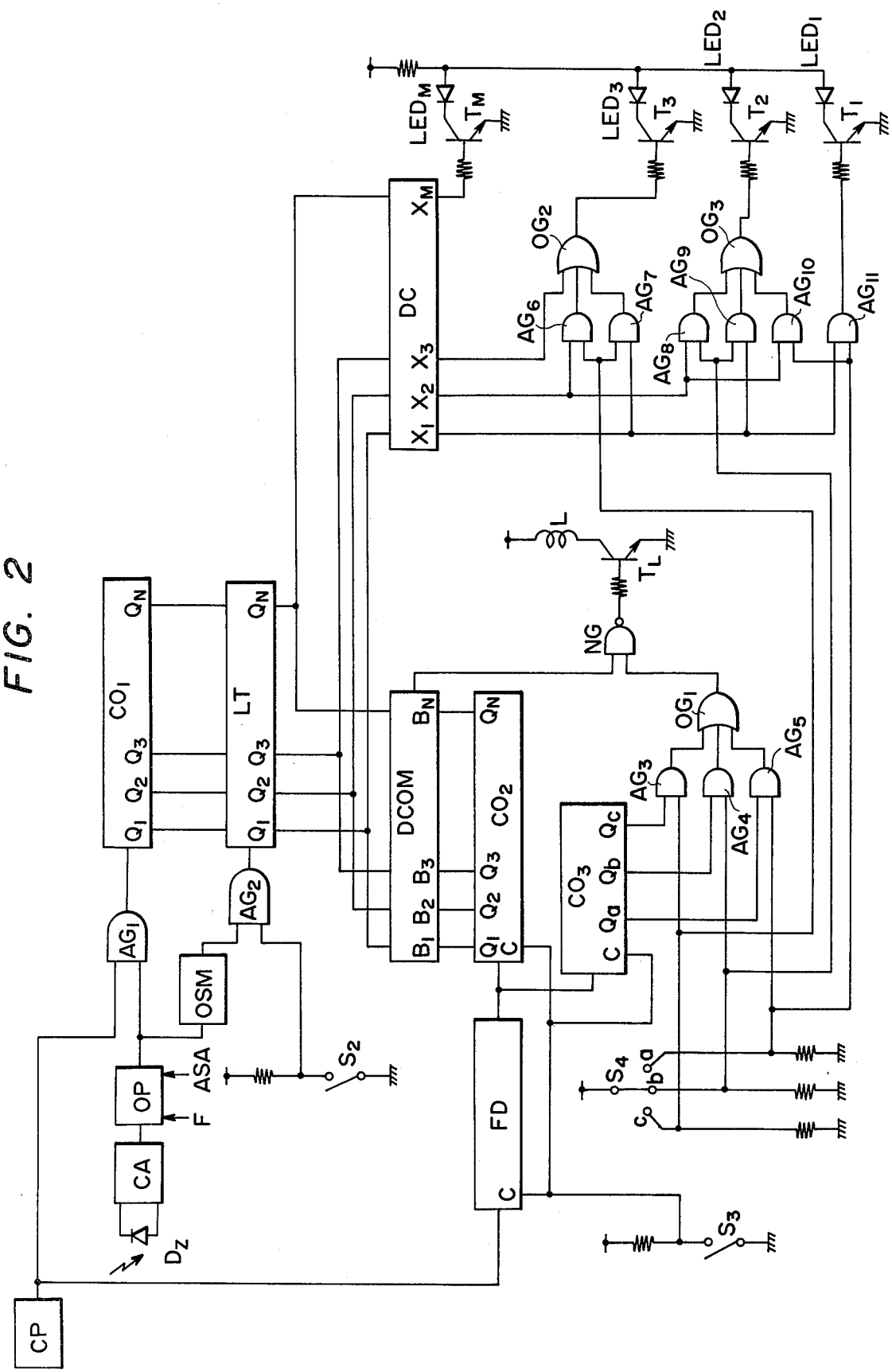
FIG. 2 is a circuit diagram showing another embodiment of the exposure controlling circuit according to the present invention.

Now, FIG. 2 shows another embodiment in which symbol CP indicates a clock pulse generating circuit, DZ indicates a photoelectromotive element, CA indicates a brightness amplifying circuit, OP indicates an operating circuit for operating the brightness information, diaphragm information F and film sensitivity information ASA, OSM indicates a one shot multivibrator circuit, $CO_1$ to $CO_3$ indicate binary counter circuits, LT indicates a latch circuit, FD indicates a frequency dividing circuit, DCOM indicates a digital comparator circuit, DC indicates a decorder circuit, $AG_1$ to $AG_{11}$ indicate AND gate circuits, $OG_1$ to $OG_3$ indicate OR gate circuits, $T_1$, $T_2$, $T_3$, $T_L$ and $T_M$ indicate transistors, $LED_1$, $LED_2$, $LED_3$ and $LED_M$ indicate luminous diodes, $S_2$ indicates a memory switch $S_3$ indicates a timing switch and $S_4$ indicates a changing-over switch for setting a suitable highest shutter speed.

The operation of the embodiment shown in FIG. 2 shall be explained in the following.

In photographing, when the release button of the camera is pushed, first a current source switch not shown will be switched on and a voltage will be supplied to the respective parts of the circuit. A light measuring operation will be started by the photoelectromotive element DZ. In the operating circuit OP, a single pulse output corresponding to the proper exposure time obtained by operating the brightness information of the object to be photographed from the brightness amplifying circuit CA, diaphragm information F and film sensitivity information ASA will be obtained. The sampling period of the operation of this operating circuit OP will be, for example, 5 ms and the width of a single pulse output inversely proportional to the brightness of the object to be photographed will vary momentarily with the sampling period. The AND gate circuit $AG_1$ will open the gate with the single pulse output corresponding to the proper exposure time T, will pass the clock pulses from the clock pulse generating circuit CP and will make the counter circuit $CO_1$ count them. This counted value will correspond to the proper exposure time T and will be put into the latch circuit LT. When the single pulse output ends, a latch signal will be given from the one shot multi-vibrator circuit OSM and will be latched by the latch circuit LT. Further, the signal latched by the latch circuit LT will enter the comparator circuit DCOM and decorder circuit DC. AT this time, the signal converted by the decorder circuit DC will indicate the proper exposure time. The relation of this conversion shall be explained in the following. If the changing-over switch $S_4$ is so arranged as to regulate the shortest exposure time to be respectively 1/2000 second when connected to the terminal a, 1/1000 second when connected to the terminal b and 1/500 second when connected to the terminal c, when the changing-over switch $S_4$ is connected to the terminal a, an output corresponding to an over exposure above 1/2000 second will be fed out from the output terminal $X_1$, outputs corresponding to the exposure time less the shotest and longest exposure times will be fed out from the output terminals $X_3$ to $X_{M-2}$ (not shown), an output corresponding to the longest exposure time will be fed out from the output terminal $X_{M-1}$ (not shown) and an output corresponding to an under exposure will be fed out from the output terminal $X_M$. When the changing-over switch $S_4$ is connected to the terminal b, 1/1000 second will be shortest exposure time, therefore outputs corresponding to the over exposure will be fed out from the output terminals $X_1$ and $X_2$ and an output corresponding to 1/1000 second will be fed out from the output terminal $X_3$. Further, when the switch $S_4$ is connected to the terminal c, an output corresponding to 1/500 second which is the shortest exposure time will be fed out from the output terminal $X_4$ as a result.

This operation shall be concretely explained in the following. First of all, in case the changing-over switch $S_4$ is connected to the terminal a, the terminal a will be on the "H" level, the terminals b and c will be placed on the "L" level, therefore the AND gate circuits $AG_6$, $AG_7$, $AG_8$ and $AG_9$ will close the gates, the outputs will be respectively on the "L" level and the AND gate circuits $AG_{10}$ and $AG_{11}$ will be able to open the gates. Therefore, the outputs of the AND gate circuits $AG_{10}$ and $AG_{11}$ will become signal levels from the output terminals $X_1$ and $X_2$ of the decorder circuit DC put into the other input terminals. Now, if the output terminal $X_1$ of the decorder circuit DC is on the "H" level, the output of the AND gate circuit $AG_{11}$ will be on the "H" level, the transistor $T_1$ will make conductive, the luminous diode $LED_1$ will light to indicate that the exposure time at this time will be above 1/2000 second and that the photographing will be of an over exposure. Further, if the output terminal $X_2$ is on the "H" level, the output of the AND gate circuit $AG_{10}$ will be on the "H" level, the OR gate circuit $OG_3$ will open the gate, the output will be on the "H" level, the transistor $T_2$ will become conductive state and the luminous diode $LED_2$ will light to indicate that the exposure time at this time will be 1/2000 second. Further, if the output terminal $X_3$ is on the "H" level, the OR gate circuit $OG_2$ will open the gate, the output will be on the "H" level, the transistor $T_3$ will become conductive state, the luminous diode $LED_3$ will light and the exposure time at this time will be indicated to be 1/1000 second. In the same manner, if any of the output terminals $X_4$ (not shown) to $X_M$ is on the "H" level, any of the transistors $T_4$ (not shown) to $T_M$ corresponding to it will become conductive state, any one of the luminous diodes $LED_4$ (not shown) to $LED_M$ will be lighted to indicate the exposure time at this time. It is needless to say that, in this case, if the luminous diode $LED_M$ lights, the photographing will be of under exposure.

In case the changing-over switch $S_4$ is connected to the terminal b, the terminal b will be on the "H" level, the terminals a and c will be placed on the "L" level, therefore, the AND gate circuits $AG_6$, $AG_7$, $AG_{10}$ and $AG_{11}$ will close the gates, the outputs will be respectively on the "L" level, the luminous diode $LED_1$ will be unable to light and the AND gate circuits $AG_8$ and $AG_9$ will be able to open the gates. Therefore, the outputs of the AND gate circuits $AG_8$ and $AG_9$ will become signal levels from the output terminals $X_1$ and $X_2$ of the decorder circuit DC put into the input terminals on the other side. Now, if the output terminal $X_1$ or $X_2$ of the decorder circuit DC is on the "H" level, the output of the AND gate circuit $AG_8$ or $AG_9$ will be on the "H" level, the OR gate $OG_3$ will open the gate and the output will be on the "H" level. Therefore, the transistor $T_2$ will become conductive state and the luminous diode $LED_2$ will light to indicate that the exposure time at this time will be above 1/1000 second and that the photographing will be of an over exposure. Further, if the output terminal $X_3$ is on the "H" level, the OR gate $OG_2$ will open the gate and its output will be on the "H" level. Therefore, the transistor $T_3$ will become conductive state and the luminous diode $LED_3$ will light to indicate that the exposure time at this time will be 1/1000 second. By the way, the operation when any of the output terminals $X_4$ to $X_M$ of the decorder circuit DC is on the "H" level will be the same as in the above described case and shall not be explained in detail.

Further, in case the changing-over switch $S_4$ is connected to the terminal c, the terminal c will be on the "H" level, the terminal a will be placed on the "L" level, the AND gate circuits $AG_8$, $AG_9$, $AG_{10}$ and $AG_{11}$ will close the gates, the outputs will be respectively on the "L" level and the luminous diodes $LED_1$ and $LED_2$ will be unable to light. On the other hand, the AND gate circuits $AG_6$ and $AG_7$ will be able to open the gates and the outputs will be the signal levels from the output terminals $X_1$ and $X_2$ of the decorder circuit DC put into the input terminals on the other side. If the output terminals $X_1$ and $X_2$ of the decorder circuit DC are on the "H" level, the outputs of the AND gate circuits $AG_6$ and $AG_7$ will be on the "H" level in response to them. Further, if the output terminal $X_3$ is on the "H" level, the OR gate circuit $OG_2$ will directly open the gate and the output will be on the "H" level. In either case, the transistor $T_3$ will become conductive state and luminous diode $LED_3$ will light to indicate that the exposure time at this time will be above 1/500 second and will be of an over exposure. By the way, in this case, too, the operation when any of the output terminals $X_4$ to $X_M$ of the decorder circuit DC is on the "H" level will be the same as in the above described case.

The operation of controlling the shutter shall be explained in the following.

First, when the shutter button of the camera is pushed, a mirror not shown will be unlocked and will spring up to a non-reflecting position. But, prior to this motion of the mirror, the memory switch $S_2$ will be closed. As a result, the input on one side of the AND gate circuit $AG_2$ will be reversed to the "L" level and therefore the output will reverse to the "L" level. Therefore, the information corresponding to the proper exposure time T in response to the brightness of the object to be photographed before the mirror is sprung up will be fixed in the latch circuit LT. Subsequently the diaphragm blades will be brought into a preset aperture position. When the springing motion of the mirror is thus completed, the shutter will be released. When the shutter blades are thus opened, the timing switch $S_3$ wil be closed. As a result, the frequency dividing circuit FD will be released from the clear state, the clock pulse output from the clock pulse generating circuit CP will be divided, for example, to be of 1000 times through the frequency dividing circuit FD and will be given to the counter circuits $CO_2$ and $CO_3$. The output of the counter circuit $CO_2$ will be fed into the comparator circuit DCOM and will be compared with the signal latched by the latch circuit LT. When the above mentioned output coincides with the signal, the output of the comparator circuit DCOM will reverse to the "H" level. The outputs $Q_a$, $Q_b$ and $Q_c$ of the counter circuit $CO_3$ are to regulate the shortest exposure time. When the changing-over switch $S_4$ is connected to the respective terminals a, b and c, the outputs of the AND gate circuits $AG_5$, $AG_4$ and $AG_3$ will respectively obtain the outputs of the counter circuit $CO_3$ at the time points corresponding respectively to the shortest exposure times. Therefore, at the above described respective time points, the input will be given to the input terminal on one side of the NAND gate circuit NG through the OR gate circuit $OG_1$ and the output from the comparator circuit DCOM will be fed into the input terminal on the other side. When the output slower in rising of the outputs from the comparator circuit DCOM and counter circuit $CO_3$ is given to the NAND gate circuit NG, the output will reverse to the "L" level to make the transistor $T_L$ non-conductive. As a result, the coil L will be de-energized to close the shutter. Therefore, in the case of this embodiment, too, the shortest exposure time to be determined by the brightness of the object to be photographed will be limited to be of a preset value.

As described above, according to the present invention, the shortest exposure time of the shutter is regulated in comformity with the performance of the shutter mechanism and therefore, even if the exposure is rather over, photographing having no exposure fluctuation will be able to be made. Further, as the shortest exposure time is made selectable, one controlling circuit can be applied to cameras of respective classes. Thus, a very useful exposure controlling circuit of this type can be provided.

We claim:

1. An exposure controlling circuit for electric shutters comprising a first time circuit which can determine a proper exposure time in response to the brightness of an object to be photographed, and a second time circuit which is connected with said first time circuit and can determine the shortest exposure time, said first and second time circuits being arranged so as to be able to start their operations simultaneously as associated with the opening of the shutter and being arranged so that the shutter can only be closed when both states of said first and second time circuits reverse.

2. An exposure controlling circuit for electric shutters according to claim 1, wherein said second time circuit is so arranged that the shortest exposure time to be determined by it can be selected.

* * * * *